(12) United States Patent
Chikazawa

(10) Patent No.: US 7,330,636 B2
(45) Date of Patent: Feb. 12, 2008

(54) PORTABLE VIDEO RECORDER SYSTEM

(75) Inventor: Yoshiharu Chikazawa, Yokohama (JP)

(73) Assignee: Thomson Licensing, Boulogne-Billancourt (FR)

( * ) Notice: Subject to any disclaimer, the term of this patent is extended or adjusted under 35 U.S.C. 154(b) by 1071 days.

(21) Appl. No.: 10/343,865

(22) PCT Filed: Jul. 26, 2001

(86) PCT No.: PCT/EP01/08640

§ 371 (c)(1),
(2), (4) Date: Feb. 4, 2003

(87) PCT Pub. No.: WO02/13523

PCT Pub. Date: Feb. 14, 2002

(65) Prior Publication Data

US 2004/0013400 A1    Jan. 22, 2004

(30) Foreign Application Priority Data

Aug. 8, 2000    (EP) .................................. 00402242

(51) Int. Cl.
*H04N 5/00*    (2006.01)
*H04N 7/26*    (2006.01)

(52) U.S. Cl. .................. 386/46; 386/109; 386/117

(58) Field of Classification Search ............... 386/46, 386/95, 108, 113, 117, 111, 309
See application file for complete search history.

(56) References Cited

U.S. PATENT DOCUMENTS

| 5,170,262 | A | 12/1992 | Kinoshita et al. ........... 358/335 |
| 6,052,509 | A | 4/2000 | Abe .......................... 386/117 |
| 6,212,208 | B1 * | 4/2001 | Yoneda et al. .............. 370/538 |
| 6,545,709 | B2 * | 4/2003 | Takei et al. .............. 348/222.1 |
| 6,763,178 | B1 * | 7/2004 | Suzuki et al. ................. 386/95 |
| 6,844,895 | B1 * | 1/2005 | Billerbeck et al. ....... 348/211.2 |

FOREIGN PATENT DOCUMENTS

EP    932 309 A2    7/1999

* cited by examiner

*Primary Examiner*—Thai Q. Tran
*Assistant Examiner*—Mishawn Dunn
(74) *Attorney, Agent, or Firm*—Joseph J. Laks; Robert B. Levy; Jorge Tony Villabon

(57) ABSTRACT

The invention relates to a portable video recorder system. This system comprises a video shooting part including an image capturing device, video compression means, a buffer memory filled by the output of the video compression means and low data rate wireless transmission equipment having a short range, and a recording part including a reception equipment and a cassette, or tape, or disk, or solid state memory recording unit. Means are provided for the simultaneous wireless transmission of data from the memory of the capturing device and the filling of this memory.

4 Claims, 1 Drawing Sheet

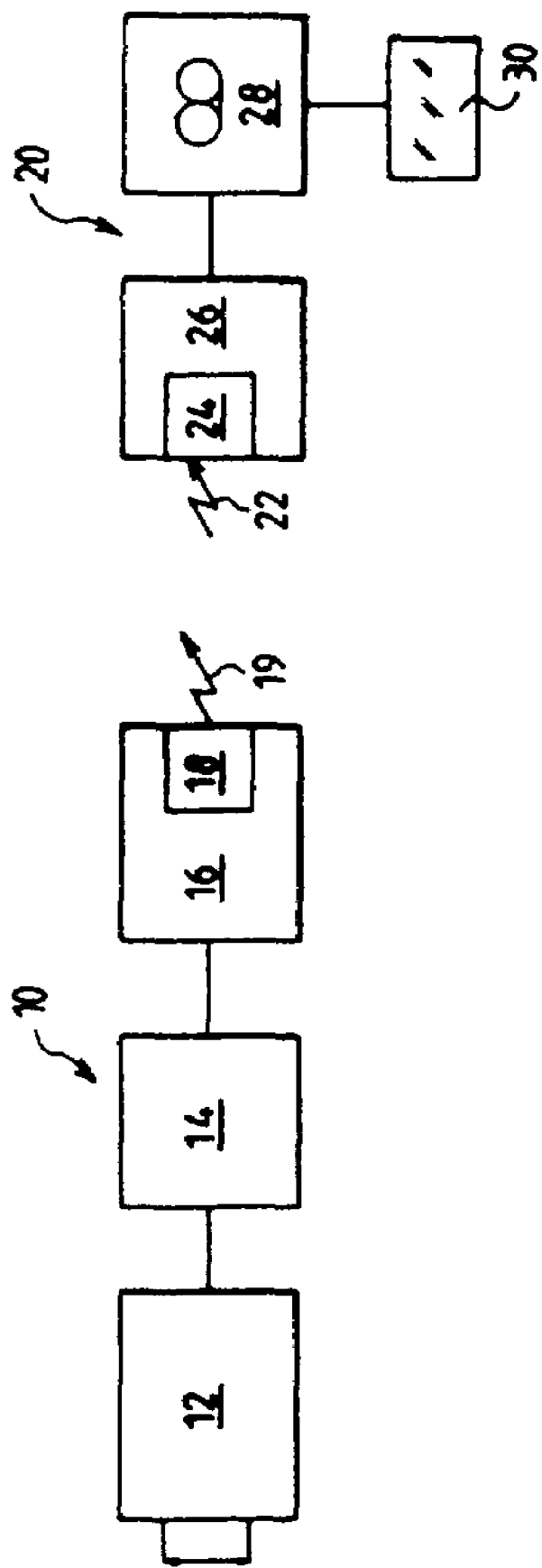

PORTABLE VIDEO RECORDER SYSTEM

This application claims the benefit under 35 U.S.C. § 365 of International Application PCT/EP01/08640 filed Jul. 26, 2001, which claims the benefit of European Application No. 00402242.2, filed Aug. 8, 2000.

The invention relates to a portable video recorder system.

BACKGROUND OF THE INVENTION

The camcorders which are presently available on the market may have a very small weight. They may also operate automatically. Therefore, they are quite easy to use. However, it is necessary to use both hands for controlling the operation of the camcorder. This may be inconvenient for certain usages of a camcorder, for instance if the user wishes to take written notes when he is shooting a scene.

It is the reason why it has been proposed to separate the image capturing part of the camcorder from the processing and recording part. In fact, the mechanical recording part has the greatest consumption of energy and it is the heaviest part of the camcorder. In this case, the first part, which comprises the image capturing device and a buffer memory, is very light and may be carried with free hands, for instance on the forehead. The buffer memory may be used, after the shooting, to transfer the recording to a cassette or tape having a greater capacity than this buffer memory.

However, a buffer memory has a limited capacity, for instance about one minute of recording. Therefore, it is necessary to frequently transfer the content of the memory to the cassette. This operation is not quite convenient. Moreover, during this transfer the image capturing device cannot be used.

SUMMARY OF THE INVENTION

The invention overcomes these drawbacks.

The portable video recording system according to the invention is characterized by the fact that it comprises:
- a video shooting part including an image capturing device, video compression means, a buffer memory filled by the output of the video compression means and low data rate wireless transmission equipment having a short range, and
- a recording part including a reception equipment and a cassette or tape or disk or solid state recording unit.

Of course, audio data, compressed or not, are generally transmitted together with compressed video data.

With a wireless transmission the user may carry the recording part in the pocket or in a bag.

Preferably, the system comprises means for simultaneously transmitting data from the memory of the capturing device and filling this memory. Therefore, the transmission and the recording on a cassette, tape, disk or solid state memory happen during the shooting of scenes by the image capturing device.

In an embodiment the recording part includes a buffer memory which provides data to the cassette, tape, disk, or solid state memory at a higher rate than the wireless transmission data.

With the provision of two buffer memories, it is possible to use conventional cassette or disk recording units and to transmit the data with a very low data rate compared to the data rate of filling the first memory. Therefore, the transmission means by very cheap. For instance, they may be of the kind which is currently available for transmitting data from a mobile telephone to a loudspeaker or from a microphone to a mobile telephone.

As the buffer memory of the video shooting part is filled at a higher rate than it is emptied by transmission to the recording part, this buffer memory may be quickly saturated, for instance after one minute of shooting. This means that the video recording system must be used only intermittently, i.e. after one minute of shooting it is necessary to wait a few minutes in order that space becomes available in the buffer memory. This intermittent operation of the system is not a drawback because it corresponds to the usual way of operating a camcorder. The recording time of scenes is generally comprised between 10 seconds and a maximum of one minute, and the time separating the shooting of two scenes may be several minutes.

In brief the invention concerns a portable video recorder system comprising:
- a video shooting part including an image capturing device, video compression means, a buffer memory filled by the output of the video compression means and low data rate wireless transmission equipment having a short range, and
- a recording part including a reception equipment and a cassette, or tape, or disk, or solid state memory recording unit.

The portable video recorder system comprises, in a preferred embodiment, means for the simultaneous wireless transmission of data from the memory of the capturing device and the filling of this memory.

The low data rate transmission equipment of the video shooting part has, in an embodiment, a transmission rate which is about 10 times less than the data rate of filling of the buffer memory of this video shooting part.

The recording part includes preferably a buffer memory which provides data to the cassette, or tape, or disk, or solid state memory at a higher rate than the wireless transmission data.

The data rate of the wireless transmission equipment may be about 2 Megabits per second.

The portable video recorder system comprises preferably means for audio detection and storing into the buffer memory of the shooting part and for transmission together with video data.

BRIEF DESCRIPTION OF THE DRAWINGS

Other features and advantages of the invention will appear with the description of certain of its embodiments, this description being made with reference to the herein appended drawing which represents a video recording system according to the invention.

DETAILED DESCRIPTION

The video recorder system represented on the drawing comprises two parts:

A first part 10 for audio and video shooting and a second part 20 for audio and video cassette recording.

The first part 10 is designed to have a very small weight in order to be carried preferably on the forehead. This first part 10 comprises a classical image capturing device 12 with a lens and a microphone (not shown). The image is detected by CCD detectors. Video and audio compression means 14 receive the audio and TV data and compress them, for instance according to the MPEG 2 or MPEG 4 standard.

The audio and video compressed data are provided to a buffer memory 16 having, for instance, a capacity of 1

Gigabit, and the data of this buffer memory 16 are provided to a communication interface 18 in order to transmit these data with a low data rate through a transmission antenna 19. The transmission equipment has a small range in order to avoid interferences with neighbouring equipments.

In an example, the memory 16 is filled at a rate of about 22 Megabits/second and the transmission rate of the antenna 18 is 2 Megabits/second.

The data transmitted by antenna 19 are received by receiving antenna 22 which provides, through an interface 24, the received data to a buffer memory 26 and this buffer memory 26 provides the received compressed audio and video data to a cassette recorder 28. In the example, this recording part 20 is also provided with a LCD display 30.

The battery (not shown) for controlling the operation of the capturing part 10 may be very small. This capturing part 10 may have a completely automatic operation. For the shooting of the scenes in an embodiment use is made of a conventional eye controller which detects the direction of observation of the eye in order to focus the objective lens to the scene in the direction observed by the eye of the user.

As, in the example, the buffer memory has a capacity of 1 Gigabit and is filled at a rate of about 22 Mbits/second, it is filled (saturated) after about one minute of shooting because the transmission rate of 2 Mbits/second, i.e. the evacuation rate from the memory 16, is not sufficient to empty the memory. About 10 minutes are necessary for transmitting the whole content of memory 16 to memory 26. It has been found that this necessary intermittent operation of the system is quite acceptable for such video recorder system because, in general, scenes are shooted intermittently.

In other words, the invention is based on a deliberate choice of a low transmission rate, in order to provide a portable video recorder system at low price and it has been observed that this low data rate transmission is capatible with the common use of such a product.

Instead of a cassette recorder, any type of recording unit may be used, such as IC memroy recorder or disk recorder including optical or magnetic recording, for instance a hard disk recorder.

What is claimed is:

1. A portable video recorder system comprising:
   a video shooting part including an image capturing device for shooting scenes, video compression means connected to said capturing device, said video compression means compressing audio and TV data according to the required standard, a buffer memory filled by the output of the video compression means and low data rate wireless transmission equipment having a short range for transmitting the data of the buffer memory with a low data rate, and
   a recording part including a reception equipment comprising a reception antenna which provides through a communication interface the received data to a buffer memory and a cassette, or tape, or disk, or solid state memory recording unit which receives data from the buffer memory at a higher rate than the wireless transmission.

2. A portable video recorder system according to claim 1, wherein the low data rate transmission equipment of the video shooting part has a transmission rate which is about 10 times less than the data rate of filling of the buffer memory of this video shooting part.

3. A portable video recorder system according to claim 1, wherein the data rate of the wireless transmission equipment is about 2 Megabits per second.

4. A portable video recorder system according to claim 1, comprising means for audio detection and storing into the buffer memory of the shooting part and for transmission together with video data.

\* \* \* \* \*